(12) United States Patent
Kato et al.

(10) Patent No.: US 8,198,763 B2
(45) Date of Patent: Jun. 12, 2012

(54) CONTROLLER-INTEGRATED ELECTRIC ROTATING MACHINE WITH A SHIFTED CONTROL CIRCUIT

(75) Inventors: Masaki Kato, Chiyoda-ku (JP); Yoshihito Asao, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 12/089,589

(22) PCT Filed: Feb. 13, 2007

(86) PCT No.: PCT/JP2007/052463
§ 371 (c)(1),
(2), (4) Date: Apr. 8, 2008

(87) PCT Pub. No.: WO2007/097222
PCT Pub. Date: Aug. 30, 2007

(65) Prior Publication Data
US 2009/0243407 A1 Oct. 1, 2009

(30) Foreign Application Priority Data
Feb. 21, 2006 (JP) .................. 2006-043301

(51) Int. Cl.
*H02K 19/22* (2006.01)
*H02K 9/00* (2006.01)
(52) U.S. Cl. ........................ 310/62; 310/68 D
(58) Field of Classification Search .............. 310/52, 310/60 A, 64, 62, 53, 58, 60 R, 68 R, 71, 310/68 D, 68 B; *H02K 9/00, 19/22*
See application file for complete search history.

(56) References Cited

U.S. PATENT DOCUMENTS

| 4,419,597 | A | * | 12/1983 | Shiga et al. | 310/68 D |
| 4,794,285 | A | * | 12/1988 | Nimura et al. | 310/68 D |
| 5,710,467 | A | * | 1/1998 | Irie et al. | 310/64 |
| 5,977,669 | A | * | 11/1999 | Yoshida et al. | 310/68 D |
| 6,184,602 | B1 | * | 2/2001 | Ooiwa et al. | 310/68 D |
| 6,252,320 | B1 | * | 6/2001 | Ballard et al. | 310/68 D |
| 6,700,243 | B2 | * | 3/2004 | Asao | 310/68 D |
| 7,208,918 | B2 | | 4/2007 | Shirakawa et al. | |
| 7,400,070 | B2 | * | 7/2008 | Asao et al. | 310/58 |

(Continued)

FOREIGN PATENT DOCUMENTS
CN 1695288 A 11/2005
(Continued)

*Primary Examiner* — Quyen Leung
*Assistant Examiner* — Michael Andrews
(74) *Attorney, Agent, or Firm* — Sughrue Mion, PLLC

(57) ABSTRACT

In a controller-integrated electric rotating machine provided with a power circuit unit and a control circuit unit, a cooling property is improved so that the control circuit unit does not impair a flow of air for cooling the power circuit unit.

A power circuit unit (30) having switching elements (30a, 30b) for converting DC power to AC power for supplying the AC power to an electric rotating machine (2), a control circuit unit (32) for controlling the switching elements (30a, 30b) of the power circuit unit (30), and a rotational position detection sensor (4) arranged on a rotating shaft (22) for detecting the rotation of the rotating shaft (22) are provided, and the control circuit unit (32) is disposed at a position where the power circuit unit (30) is not disposed when viewed in the direction of the rotating shaft, and is disposed at a position shifted radially outward so as not to be overlapped with the rotational position detection sensor (4) when viewed in the direction of the rotating shaft.

25 Claims, 9 Drawing Sheets

U.S. PATENT DOCUMENTS

| | | |
|---|---|---|
| 2003/0173839 A1* | 9/2003 | Torii et al. ............ 310/52 |
| 2004/0090132 A1* | 5/2004 | Utsumi et al. ............ 310/68 B |
| 2004/0211613 A1* | 10/2004 | Asao et al. ............ 180/291 |
| 2005/0237033 A1 | 10/2005 | Shirakawa et al. |
| 2005/0258690 A1 | 11/2005 | Kusumi |
| 2006/0087181 A1 | 4/2006 | Kusumi |
| 2006/0125240 A1 | 6/2006 | Kato et al. |
| 2006/0202573 A1* | 9/2006 | Uehara et al. ............ 310/64 |
| 2006/0208581 A1* | 9/2006 | Ikuta et al. ............ 310/58 |
| 2007/0103101 A1 | 5/2007 | Kikuchi et al. |
| 2007/0182384 A1 | 8/2007 | Shirakawa et al. |

FOREIGN PATENT DOCUMENTS

| | | | |
|---|---|---|---|
| JP | 2004153872 A | * | 5/2004 |
| JP | 2004156589 A | | 6/2004 |
| JP | 2004328870 A | | 11/2004 |
| JP | 200539950 A | | 2/2005 |
| JP | 2005039950 A | | 2/2005 |
| JP | 2005117708 A | | 4/2005 |
| JP | 2005328690 A | | 11/2005 |
| JP | 2005-348494 A | | 12/2005 |
| JP | 200633986 A | | 2/2006 |
| JP | 2006166681 A | | 6/2006 |

* cited by examiner

CONTROLLER-INTEGRATED ELECTRIC ROTATING MACHINE WITH A SHIFTED CONTROL CIRCUIT

TECHNICAL FIELD

The present invention relates to a structure of a controller-integrated electric rotating machine in which a controller for controlling drive of an electric rotating machine is integrated.

BACKGROUND ART

For example, an idle-stop controller is disclosed in Patent Document 1 (JP-A-2004-156589). The controller includes a switching element directly fixed to a substantially disk-shaped heat sink and a circuit board having a printed wiring layer fixed on the heat sink, and includes a control IC or the like on the circuit board. The heat sink is provided with double side frames on the entire outer periphery and the entire inner periphery attached thereto, and is fixed to an outer wall at the rear end of a bracket via the outer peripheral side frames. Resin is injected into a ring-shaped recess surrounded by the inner and outer peripheral frames of the heat sink, whereby the switching element, the circuit board and the control IC or the like are protected from salty mud water or the like.

The controller has a cooling structure in which a resin cover is fixed to the bracket so as to cover the heat sink, so that cooling air flowing from an air-intake hole provided on the resin cover flows into the bracket while cooling the heat sink, and cools a stator winding and a rotor winding, and then flows out from the bracket.

Patent Document 1: JP-A-2004-156589 (see FIG. 9 to FIG. 11, Paragraphs [0068] to [0072])

DISCLOSURE OF THE INVENTION

Problems to be Solved by the Invention

The related art described above has a problem that electronic components having low heat resistance such as the control IC on the circuit board may become damaged due to heat when the circuit board is arranged in the vicinity of the heat sink on which the switching element as a heat-generating element is fixed. Furthermore, since it is integrally sealed with resin, there is also a problem that heat of the switching element is transferred through the resin and hence the temperature of the electronic components on the circuit board is increased.

Since the substantially disk-shaped heat sink is employed as frames for sealing the switching element and the circuit board with resin, there is a problem that the shape and the layout of the heat sink are limited.

In order to solve such problems, it is an object of the present invention to provide a controller-integrated electric rotating machine having a power circuit unit and a control circuit unit in which cooling property is improved and the control circuit unit mounted thereto is downsized because of efficient pattern design.

Means for Solving the Problems

A controller-integrated electric rotating machine according to the present invention includes an electric rotating machine having a rotor with a rotating shaft and a stator disposed so as to surround the rotor, a power circuit unit having switching elements for converting DC power to AC power for supplying AC power to the electric rotating machine, a control circuit unit for controlling the switching elements of the power circuit unit, and a rotational position detection sensor arranged on the rotating shaft for detecting the rotation of the rotating shaft, and the control circuit unit is disposed at a position where the power circuit unit is not disposed when viewed in the direction of the rotating shaft, and is disposed at a position shifted radially outward so as not to be overlapped with the rotational position detection sensor when viewed in the direction of the rotating shaft.

Advantages of the Invention

According to the controller-integrated electric rotating machine in the present invention, since the control circuit unit is arranged at the position where the power circuit unit is not arranged when viewed from the direction of the rotating shaft, a cooling structure for cooling the power circuit can be optimized irrespective of the shape of the control circuit, and flow of cooling air into the power circuit unit is not impaired by the existence of the control circuit unit. In addition, thermal adverse effects due to heat conduction from the power circuit unit or radiant heat can also be avoided on the control circuit unit.

Since the power circuit unit and the control circuit unit are shifted so as not to be overlapped with each other in the direction of the rotating shaft, an effect of EMI on the circuit control unit due to the ON/OFF operation of the switching elements of the power circuit unit can be restrained.

Furthermore, since the control circuit unit is arranged at the position shifted radially outward so as not to be overlapped with the rotational position detection sensor on the rotating shaft, the effect of noise from the control circuit unit on the rotational position detection sensor is reduced.

BEST MODE FOR CARRYING OUT THE INVENTION

Figure 1:
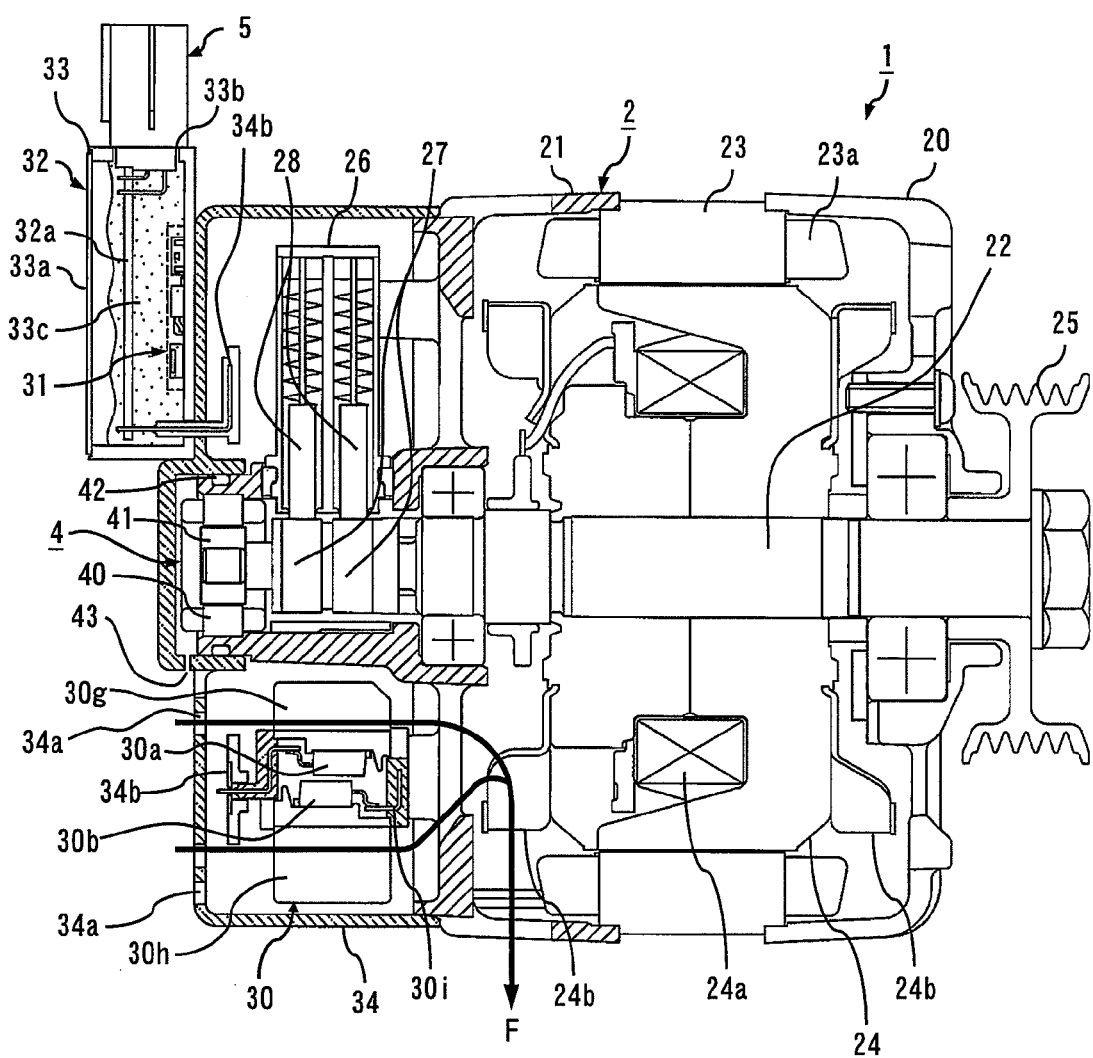
FIG. 1 is a cross-sectional view showing a controller-integrated electric rotating machine according to a first embodiment of the present invention.

Referring now to the drawings, a best mode for carrying out the invention will be described below.

First Embodiment

FIG. 1 is a cross-sectional view showing a controller-integrated electric rotating machine according to a first embodiment of the present invention. In FIG. 1, a controller-integrated electric rotating machine 1 in this embodiment includes an electric rotating machine 2 which is an AC power generating electric motor (motor generator), a controller 3 for controlling drive of the electric rotating machine 2, a rotational position detection sensor 4 for detecting the rotational position of the electric rotating machine 2, and a connector 5 for external connection and a power source terminal 6.

The electric rotating machine 2 includes a front bracket 20 and a rear bracket 21 as a case, a rotating shaft 22 rotatably supported by the case via a bearing, a stator 23 being fixed to the case and having an armature winding 23a, a rotor 24 being fixed to the rotating shaft 22 and having a field winding 24a, a cooling fan 24b being fixed to both axial end surfaces of the rotor 24, a pulley 25 secured to a front end of the rotating shaft 22, a brush holder 26 mounted to the rear bracket 21 so as to position on an outer periphery of the rotating shaft 22 on the rear side, a pair of brushes 28 arranged in the brush holder 26 so as to in sliding contact with a pair of slip rings 27 mounted to the rear side of the rotating shaft 22, and the rotational position detection sensor 4 provided at a rear end of the rotating shaft 22. The electric rotating machine 2 is connected to a rotating shaft (not shown) of an engine via the pulley 25 and a belt (not shown).

The controller 3 includes a power circuit unit 30 for converting DC power to AC power or AC power to DC power, a field circuit unit 31 for supplying field current to the field winding 24a, and a control circuit unit 32 for controlling the power circuit unit 30 and the field circuit unit 31, and is connected to an external peripherals via the external connector 5 and the power source terminal 6.

The power circuit unit 30 includes a plurality of power elements (switching elements described later) 30a and 30b, and an inner heat sink 30g and an outer heat sink 30h which also serve as electrode members to be electrically connected to the power elements 30a and 30b. Connection between the respective power elements is achieved by a conductive member 30i insert-molded in resin and the heat sinks 30g and 30h, and electrical connection to the control circuit unit 32 is achieved via a relay wiring member 34b.

The power circuit unit 30 is arranged on one end wall of the rear bracket 21 of the electric rotating machine 2, is laid out so as to surround the rotating shaft 22 as described later, and is covered by a cover 34 for preventing entry of foreign substances from the outside.

The control circuit unit 32 includes a control circuit board 32a and a resin case 33 for storing the control circuit board 32a. The case 33 has a water-proof structure that can prevent entry of salty mud water into the control circuit board 32a by a water-proof cover 33a or the like, and is provided with a water-drain hole 33b for discharging water drops formed by dew condensation in the case 33. In this example, insulating properties and resistance to environment of the control circuit unit 32 are improved by filling insulated resin 33c in the case 33.

The field circuit unit 31 may be mounted on the same board as the control circuit board 32a, and may be configured separately from the control circuit board 32a. In this example, it is mounted to the case 33 of the control circuit unit 32.

The rotational position detection sensor 4 includes a stator 40 and a rotor 41, is disposed on the rotating shaft 22 which is rather rear side of the brushes 28, and is substantially sealed by a water-proof structure in the same manner as the control circuit unit 32. In this example, the water-proof structure is achieved by a seal packing 42 mounted to the rear bracket 21, and a water-drain hole 43 is provided like the case 33. The rotational position detection sensor 4 is used for vector control when electrically driving the electric rotating machine 2.

The external connector 5 is disposed in the vicinity of the control circuit unit 32, and is electrically connected to the control circuit unit 32.

Figure 2:
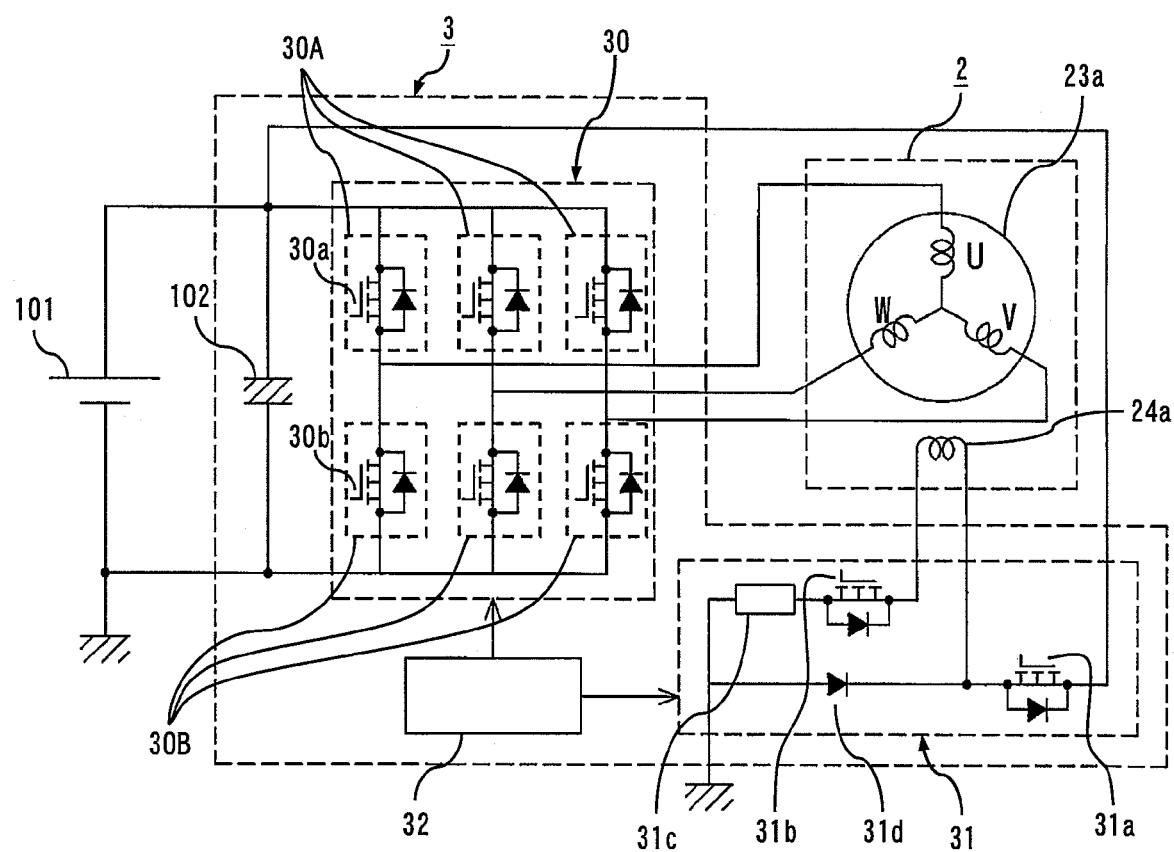
FIG. 2 is a circuit diagram for explaining the operation of an electric rotating machine according to the first embodiment of the present invention.

FIG. 2 is a circuit diagram for explaining the operation of the electric rotating machine 2 in this embodiment. In the drawing, the electric rotating machine 2 as the AC power generating electric motor includes the armature winding 23a for the stator 23 and the field winding 24a for the rotor 24, and the armature winding 23a of the stator 23 includes coils of three phases (U-phase, V-phase, and W-phase). The power circuit unit 30 includes an inverter having three sets of a switching element (power transistor, MOSFET, IGBT, etc.) 30a which constitutes an upper arm 30A with a parallel diode and a switching element 30b which constitutes a lower arm 30B with a parallel diode connected in series, and the three sets are arranged in parallel. A capacitor 102 is connected to the inverter in parallel. Ends of the respective phases of the armature winding 23a are connected respectively to mid nodes between the switching elements 30a of the upper arms 30A and the switching elements 30b of the lower arms 30B which are connected in series via the AC wiring. A positive terminal and a negative terminal of a battery 101 are connected to a positive side and a negative side of the power circuit unit 30 via a series wiring.

The field circuit unit 31 includes two semiconductor elements 31a and 31b connected in series via the brush 28 and the slip ring 27 (see FIG. 1) with the intermediary of the field winding 24a, and a flywheel diode 31d connected in parallel to a shunt resistor 31c. A drain of the upper semiconductor element 31a is connected the heat sink 30g connected to the power source terminal 6, and a source of the lower semiconductor element 31b is grounded to the rear bracket 21 via the shunt resistor 31c.

The control circuit unit 32 controls switching operation of the switching element 30a of the upper arm 30A and the switching element 30b of the lower arm 30B of the power circuit unit 30, and controls the field circuit unit 31 for adjusting the field current to be flown through the field winding 24a of the rotor.

Referring now to FIG. 2, general circuit operation of the electric rotating machine 2 in the present embodiment will be described. When the engine is started, DC power is supplied from the battery 101 to the power circuit unit 30 via the power source terminal 6. The control circuit unit 32 controls the respective switching elements 30a and 30b of the power circuit unit 30 with the ON/OFF control to convert the DC power to three-phase AC power. Then, the thee-phase AC power is supplied to the armature winding 23a of the electric rotating machine 2 as the AC power generating electric motor. On the other hand, the field circuit unit 31 supplies field current to the field winding 24a of the rotor 24 on the basis of a command from the control circuit unit 32. Linkage of magnetic flux generating around the field winding 24a and current flowing in the armature winding 23a of the stator 23 generates drive torque. The drive torque drives the rotor 24 to rotate, which is transmitted from the pulley 25 to a crankshaft of the engine via a belt (not shown), so that the engine is started.

On the other hand, in a state in which the engine is in operation, a rotational power of the engine is transmitted from the crankshaft to the pulley 25 via the belt (not shown). With this drive force, the rotor 24 fixed to the rotating shaft 22 of the electric rotating machine 2 rotates. Accordingly, the magnetic flux generated by the field winding 24a of the rotor 24 interlinks with the armature winding 23a of the stator 23, so that a three-phase AC voltage is induced in the armature winding 23a. Then, the control circuit unit 32 controls the respective switching elements 30a and 30b of the power circuit unit 30 with the ON/OFF control, so that the three-phase AC power induced in the armature winding 23a is converted into the DC power to charge the battery 101.

On the other hand, referring back to FIG. 1, the cooling fan 24b fixed to the rotor 24 generates cooling air flow F by the rotation of the rotor 24 of the electric rotating machine 2. The cooling air flow F is sucked from inlet holes 34a of the cover 34 on the rear side, passes between heat discharge fins of the heat sinks 30g and 30h provided along the direction of the rotating shaft, and cools the respective switching elements 30a and 30b. Then, the cooling air flow F passed through a ventilation hole of the rear bracket 21 is bent in the radial direction by 90° and is discharged while cooling the stator 23.

Figure 3:
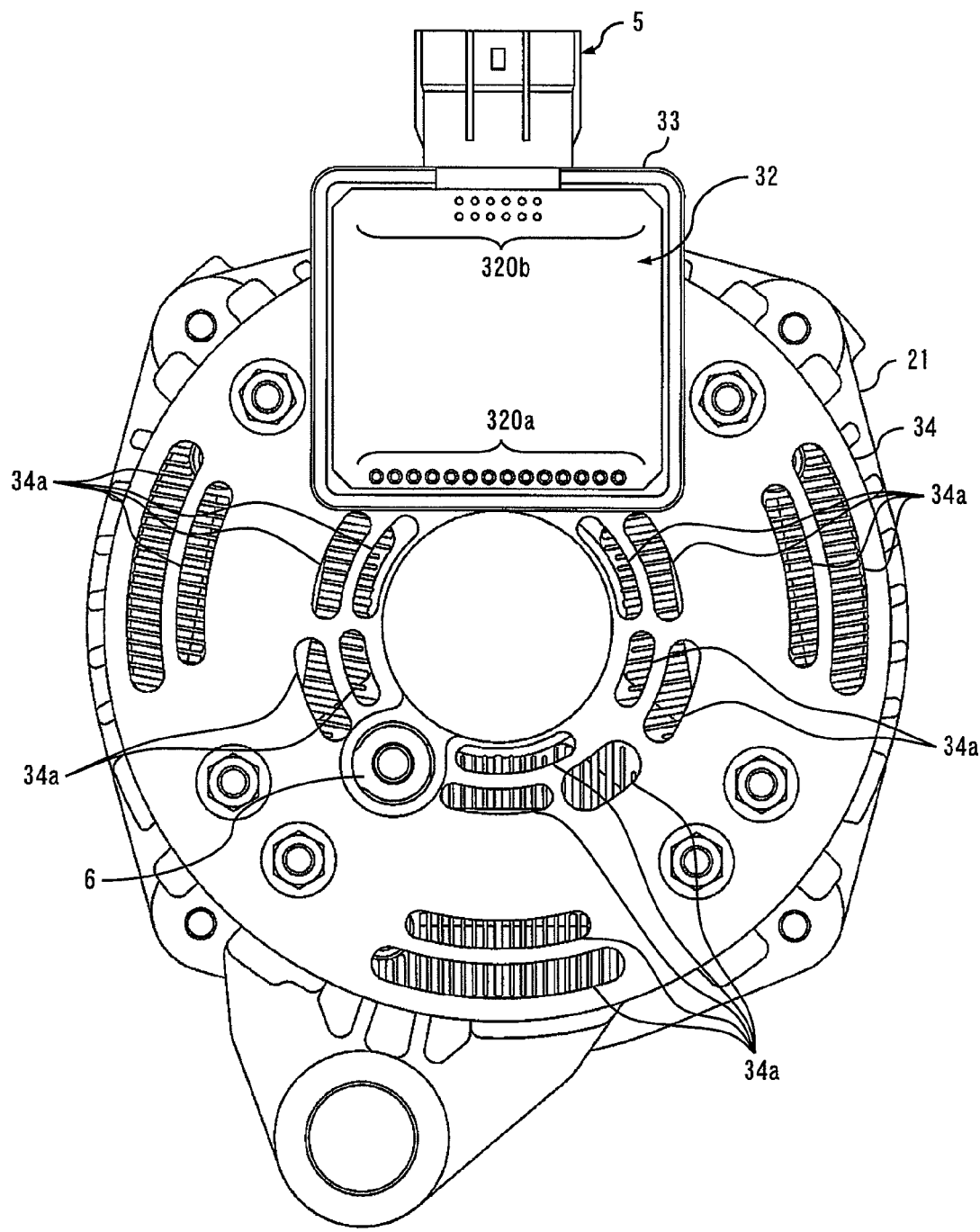
FIG. 3 is a front view of the controller-integrated electric rotating machine according to the first embodiment of the present invention when viewed in the direction of a rotating shaft.
Figure 4:
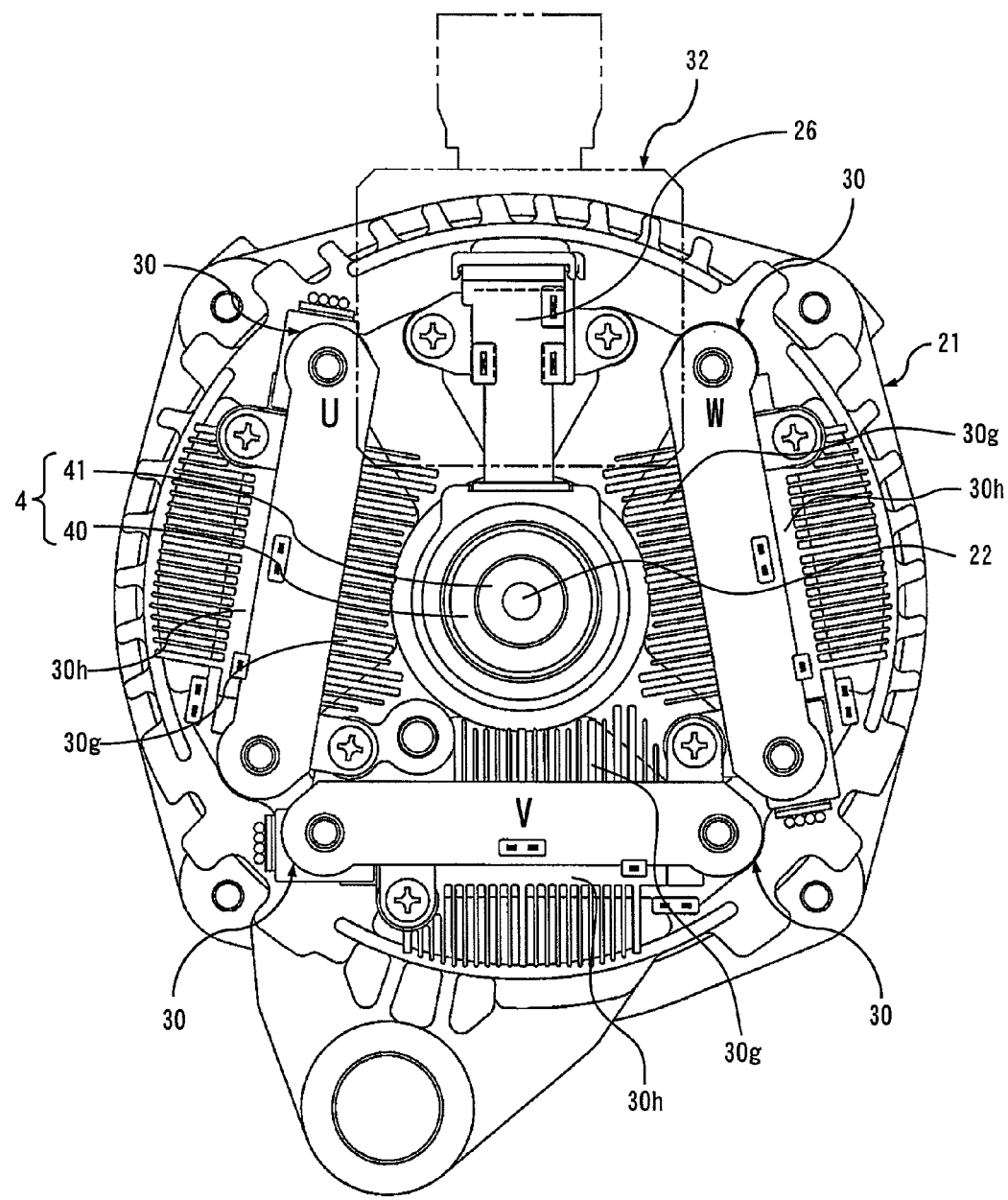
FIG. 4 is a front view corresponding to FIG. 3 in a state in which a cover of the electric rotating machine and a case of a control circuit unit are removed when viewed in the direction of the rotating shaft.

FIG. 3 is a front view showing the controller-integrated electric rotating machine according to the first embodiment of the present invention when viewed from the direction of the rotating shaft, and FIG. 4 is a front view corresponding to FIG. 3 in a state in which the cover 34 of the electric rotating machine 2 and the case 33 of the control circuit unit 32 are removed.

In the electric rotating machine in this embodiment, the controller 3 is disposed in the axial direction of the one end wall of the rear bracket 21, and the control circuit unit 32 of the controller 3 has a substantially rectangular shape when viewed in the direction of the rotating shaft. As shown in FIG. 3 and FIG. 4, the control circuit unit 32 is laid out at a position (double dashed line 32 in FIG. 4) where the power circuit unit 30 is not disposed when viewed in the direction of the rotating shaft. The control circuit unit 32 is disposed at a position shifted radially outward so as not to be overlapped with the rotational position detection sensor 4 disposed on the rotating shaft 22. Connecting portions of the control circuit unit 32 connected to the power circuit unit 30 or the rotational position detection sensor 4 are arranged intensively on one side 320a of the control circuit unit 32 and connecting portions with respect to the external connector 5 are provided on another side 320b thereof.

In the first embodiment, the control circuit unit 32 has the substantially rectangular shape when viewed in the direction of the rotating shaft. However, the shape of the control circuit unit 32 is not limited thereto. It may be any shape as long as it has one side or two sides for arranging the respective connecting portions intensively at least when viewed in the direction of the rotating shaft.

As described thus far, according to this embodiment, since the control circuit unit 32 is arranged at the position where the power circuit unit 30 is not disposed when viewed in the direction of the rotating shaft, the flow of the cooling air into the power circuit unit 30 is not impaired by the existence of the control circuit unit 32. In addition, the positions or the sizes of the inlet holes 34a provided on the cover 34 which covers the power circuit unit 30 can be optimized, so that the power circuit unit 30 can be cooled sufficiently. In addition, thermal adverse effects due to heat conduction from the power circuit unit 30 or radiant heat on the control circuit unit 32 can also be avoided.

Also, since the power circuit unit 30 and the control circuit unit 32 are shifted so as not to be overlapped with each other in the direction of the rotating shaft, an effect of EMI on the control circuit unit 31 due to the ON/OFF operation of the switching elements 30a and 30b of the power circuit unit 30 when the electric rotating machine 2 is in operation can be reduced.

Also, since the control circuit unit 32 is disposed at the position shifted radially outward so as not to be overlapped with the rotational position detection sensor 4 on the rotating shaft 22, the effect of noise from the control circuit unit 32 on the rotational position detection sensor 4 is reduced.

In the control circuit unit 32, since the connecting portions with respect to the power circuit unit 30 and the rotational position detection sensor 4 are intensively provided on the one side 320a of the control circuit unit 32, wiring design of the pattern circuit of the control circuit unit 32 can easily be performed and, simultaneously, assembleability is improved. Therefore, the control circuit unit 32 can be downsized.

In the control circuit unit 32, since the connecting portions with respect to the power circuit unit 30 and the rotational position detection sensor 4 are intensively provided on the one side 320a of the control circuit unit 32, and the connecting portions with respect to the external connector 5 are arranged on the another side 320b of the control circuit unit 32, which is different from the one side shown above, the wiring design of the pattern circuit of the control circuit unit 32 is further facilitated, so that the circuit configuration can be rationalized, and hence the control circuit unit 32 in a reliable and simple configuration can be obtained.

Since the control circuit unit 32 is formed into the substantially rectangular shape when viewed in the direction of the rotating shaft, flexibility in arrangement of elements such as a custom IC or a drive to be mounted is improved. Therefore, the pattern design of the control circuit unit 32 can be rationalized, whereby the possibility of downsizing of the control circuit unit 32 is further increased. In addition, by providing the connecting portions intensively on the side of the control circuit unit 32, assembleability and reliability such that soldering work of the connecting portions is achieved easily, and the joint state of the solder can easily be checked are improved.

Since the cover 34 having the holes 34a for cooling the power circuit unit 30 and the case 33 for storing the control circuit unit 32 are provided, and the power circuit unit 30 and the control circuit unit 32 are thermally separated, they are not thermally affected from each other and hence high cooling property can be secured.

The interior of the case 33 for storing the control circuit unit 32 is sealed with resin to provide a water-proof property to the control circuit unit 32. With such simple configuration, the insulating property and the resistance to environment of the control circuit unit 32 are improved, and heat conductivity of the elements on the control circuit board 32a to the outside can be improved with the employment of the heat conductive resin, so that increase in temperature can be restrained.

In FIG. 4, the switching elements which constitute the power circuit unit 30 are divided into the three-phase portions of U, V and W. The respective portions each include the pair of heat sinks, the inner heat sink 30g and the outer heat sink 30h. The respective heat sinks 30g and 30h each include the several switching elements 30a and 30b as discrete type power elements in parallel (not shown). The heat sinks 30g and 30h each include a cooling fin extending along a cooling air channel in the direction of the rotating shaft. In this configuration, the cooling efficiency of the respective switching elements 30a and 30b of the power circuit unit 30 increases, and the power circuit unit 30 can be downsized and optimized.

Second Embodiment

Figure 5:
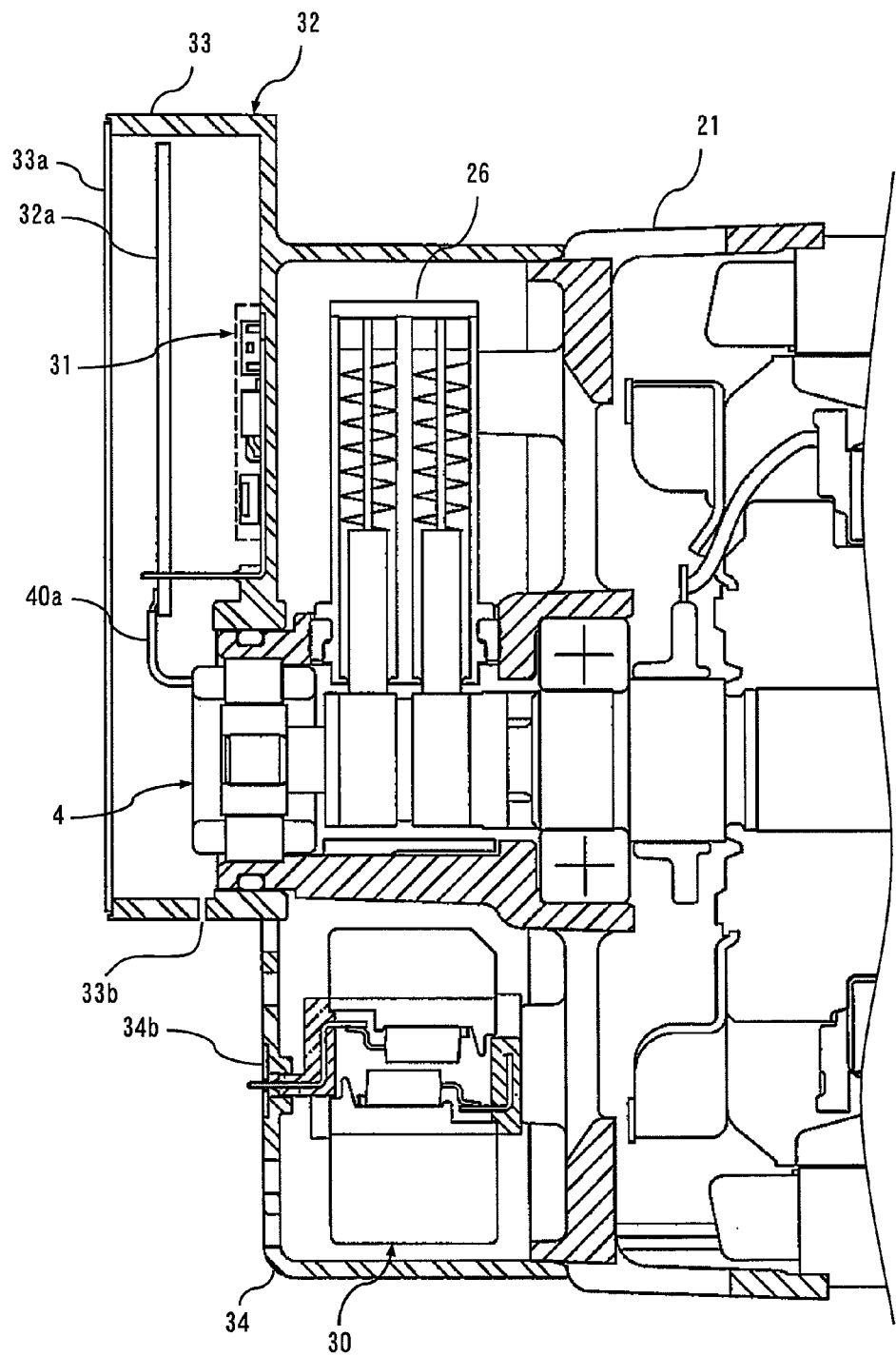
FIG. 5 is a cross-sectional view showing part of the controller-integrated electric rotating machine according to a second embodiment of the present invention.
Figure 6:
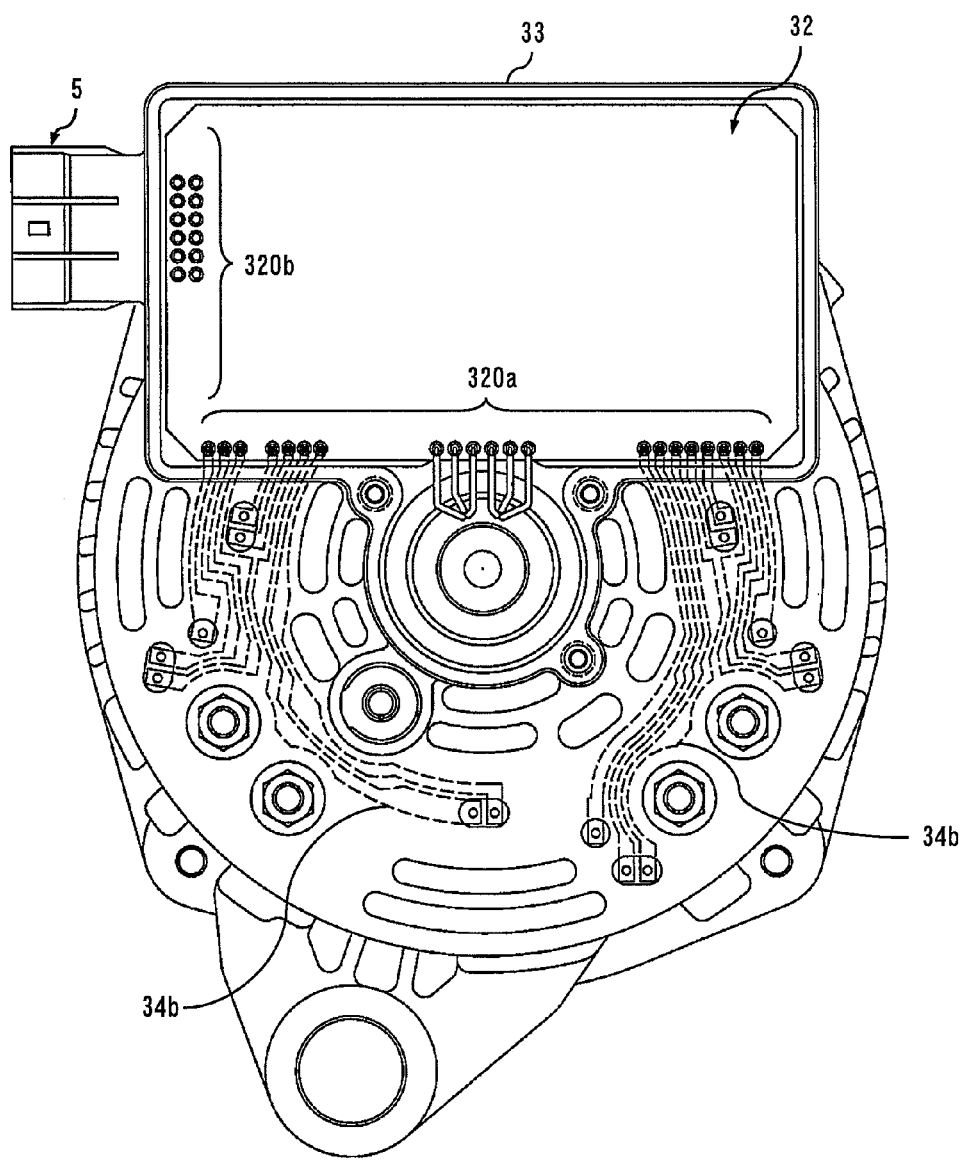
FIG. 6 is a front view of the controller-integrated electric rotating machine according to the second embodiment of the present invention when viewed in the direction of the rotating shaft.

FIG. 5 is a cross-sectional view showing part of the controller-integrated electric rotating machine according to a second embodiment of the present invention. FIG. 6 is a front view of the controller-integrated electric rotating machine according to the second embodiment of the present invention when viewed in the direction of the rotating shaft.

In the first embodiment, the position of the external connector 5 with respect to the control circuit unit 32 is the position (radially outer side) opposing the connecting portions with respect to the power circuit unit 30 and the rotational position detection sensor 4 (the radially inner side). In this embodiment, the connecting portions with the power circuit unit 30, the field circuit unit 31, and the rotational position detection sensor 4 are provided intensively to the long side 320a which is the radially inner side of the control circuit unit 32 in substantially the rectangular shape, and the connecting portions with respect to the external connector 5 are provided on the short side 320b on the circumferentially outside.

In this configuration, although the pattern design of the control circuit unit 32 is slightly difficult in comparison with the first embodiment, the surface area occupied by the control circuit unit 32 when viewed in the direction of the rotating shaft can be increased in the circumferential direction, and hence the amount of projection of the external connector S in the radial direction can be reduced. Connection wirings of the external connector 5, the rotational position detection sensor 4 and the power circuit unit 30 can be arranged rationally, and hence the control circuit unit 32 can be downsized.

As shown in FIG. 5 and FIG. 6, the case 33 for storing the control circuit unit 32 is formed integrally with the cover 34 of the power circuit unit 30 or the external connector 5 with resin. With such a configuration, the number of components can be reduced, and the necessity to fix the case 33 of the control circuit unit 32 and the cover 34 of the power circuit unit 30 individually can be eliminated, so that assembleability is improved.

In addition, the cover 34 of the power circuit unit 30 includes the relay wiring member 34b which connects the power circuit unit 30 and the control circuit unit 32 by insert molding, and the case 33 for storing the control circuit unit 32 includes a relay wiring member which connects the external connector 5 and the control circuit unit 32 by insert molding. In this configuration, the relay wiring member 34b which connects the power circuit unit 30 and the control circuit unit 32, and the relay wiring member which connects the external connector 5 and the control circuit unit 32 are reliably provided with a high insulating property, and handling of the case 33 after molding is easily, which improves assembleability.

The case 33 for storing the control circuit unit 32 has a common space used as a space for storing the control circuit board 32a and a space for storing the rotational position detection sensor 4. In this configuration, the rotational position detection sensor 4 by itself and a lead wire 40a lead therefrom can be water-proofed with ease.

The case 33 for storing the control circuit unit 32 has a water-proof structure which prevents entry of salty mud water into the control circuit board 32a and the rotational position detection sensor 4 by the water-proof cover 33a or the like, and is provided with the water-drain hole 33b for discharging water drops formed by dew condensation in the case 33. With such structure, the insulating property and the resistance to environment of the control circuit unit 32 and the rotational position detection sensor 4 are improved.

It is also possible to form a relay wiring member 40b for connecting the control circuit unit 32 and the rotational position detection sensor 4 on the case 33 for storing the control circuit unit 32 by insert molding (not shown). In this case, the vibration proof and insulating property of the lead wire 40a of the rotational position detection sensor 4 can be improved.

Third Embodiment

Figure 7:
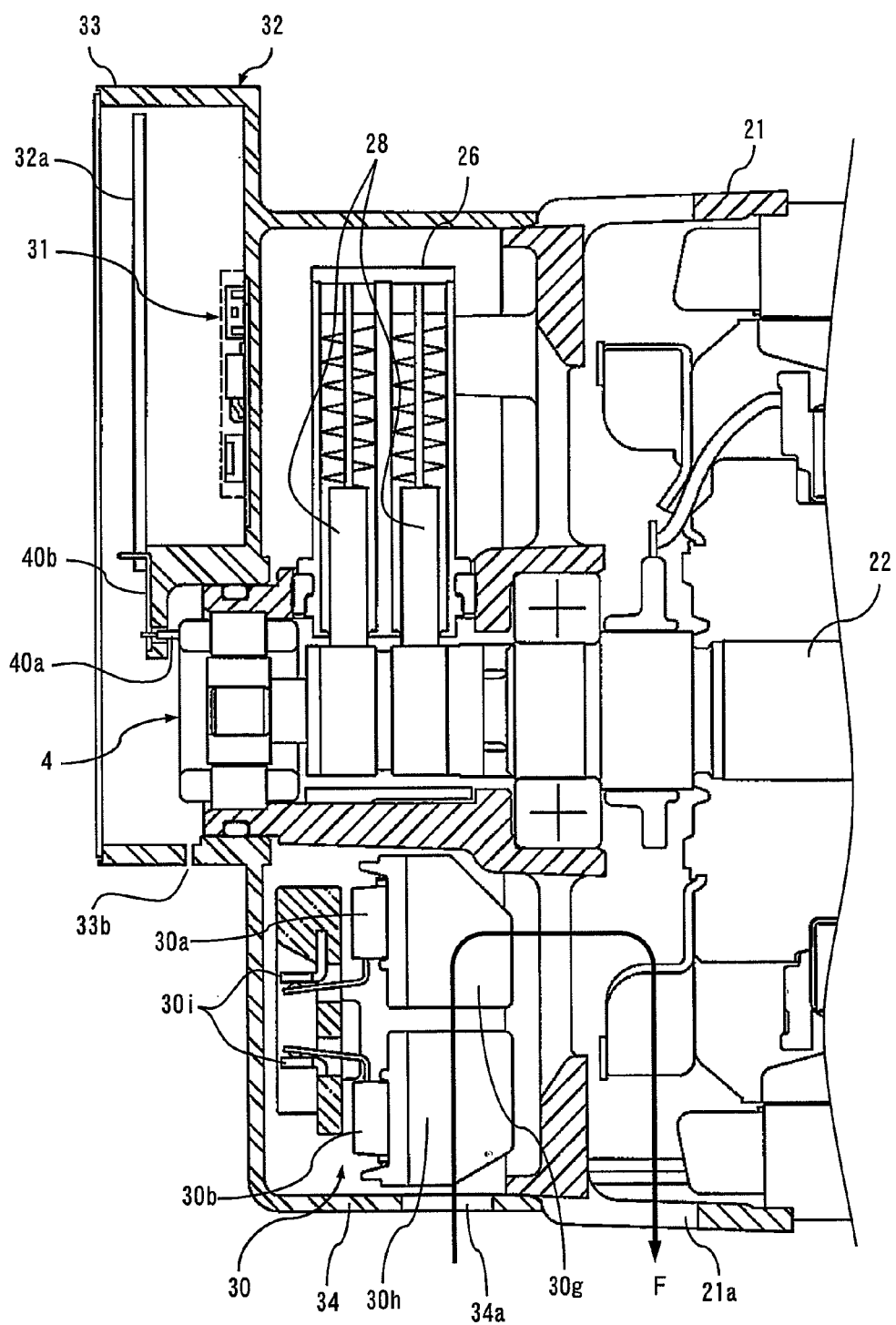
FIG. 7 is a cross-sectional view showing the controller-integrated electric rotating machine according to a third embodiment of the present invention.
Figure 8:
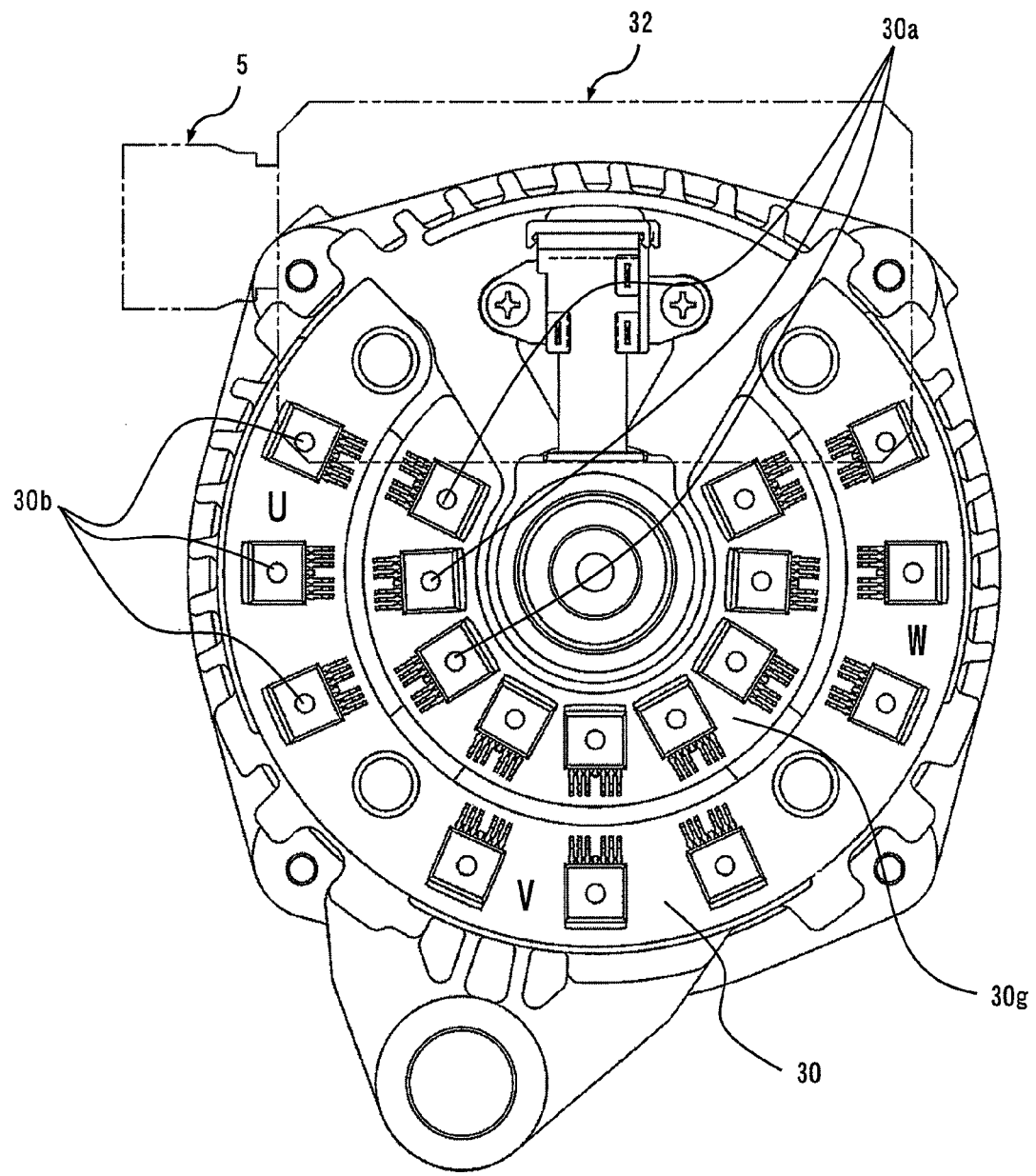
FIG. 8 is a front view corresponding to FIG. 7 in a state in which the cover of the electric rotating machine and the case of the control circuit unit are removed when viewed in the direction of the rotating shaft.

FIG. 7 is a cross-sectional view showing the controller-integrated electric rotating machine according to a third embodiment of the present invention. FIG. 8 is a front view corresponding to FIG. 7 in a state in which the cover of the electric rotating machine and the case of the control circuit unit are removed when viewed in the direction of the rotating shaft.

In the configurations according to the first and second embodiments shown above, cooling air flows into the power circuit unit 30 in the substantially axial direction through the holes 34a of the cover 34 from behind the controller-integrated electric rotating machine 1, and the respective heat sinks 30g and 30h having the switching elements 30a and 30b as the power elements each are provided with the cooling fins extending along the cooling air channel in the axial direction. In the third embodiment, the cooling air is sucked from the inlet hole 34a provided on a side wall in the radial direction of the cover 34 of the power circuit unit 30. The heat sinks 30g and 30h having the switching elements 30a and 30b mounted thereon are formed into a horseshoe shape, and are each provided with a cooling fin along the cooling air channel in the radial direction of the rotating shaft. In this configuration, the positions and the sizes of the air channel holes for cooling the power circuit unit 30 can be optimized irrespective of the shape of the control circuit unit 32.

In this example, the connections between the respective switching elements are achieved by the conductive member 30i insert-molded in resin, and the heat sinks 30g and 30h. Here, the conductive member 30i used for connecting between the respective switching elements may be connected directly to the control circuit unit 32. In this case, since the relay wiring member which connects the control circuit unit 32 and the power circuit unit 30 can be omitted, so that the number of components and the number of connection nodes are reduced owing to the aggregation of the components, whereby the assembleability is improved and the insulating property is also improved.

The case 33 for the control circuit unit 32 includes the relay wiring member 40b for connecting the control circuit unit 32 and the rotational position detection sensor 4 with insert molding, so that the vibration proof and insulating property of the lead wire 40a of the rotational position detection sensor 4 are improved.

Fourth Embodiment

Figure 9:
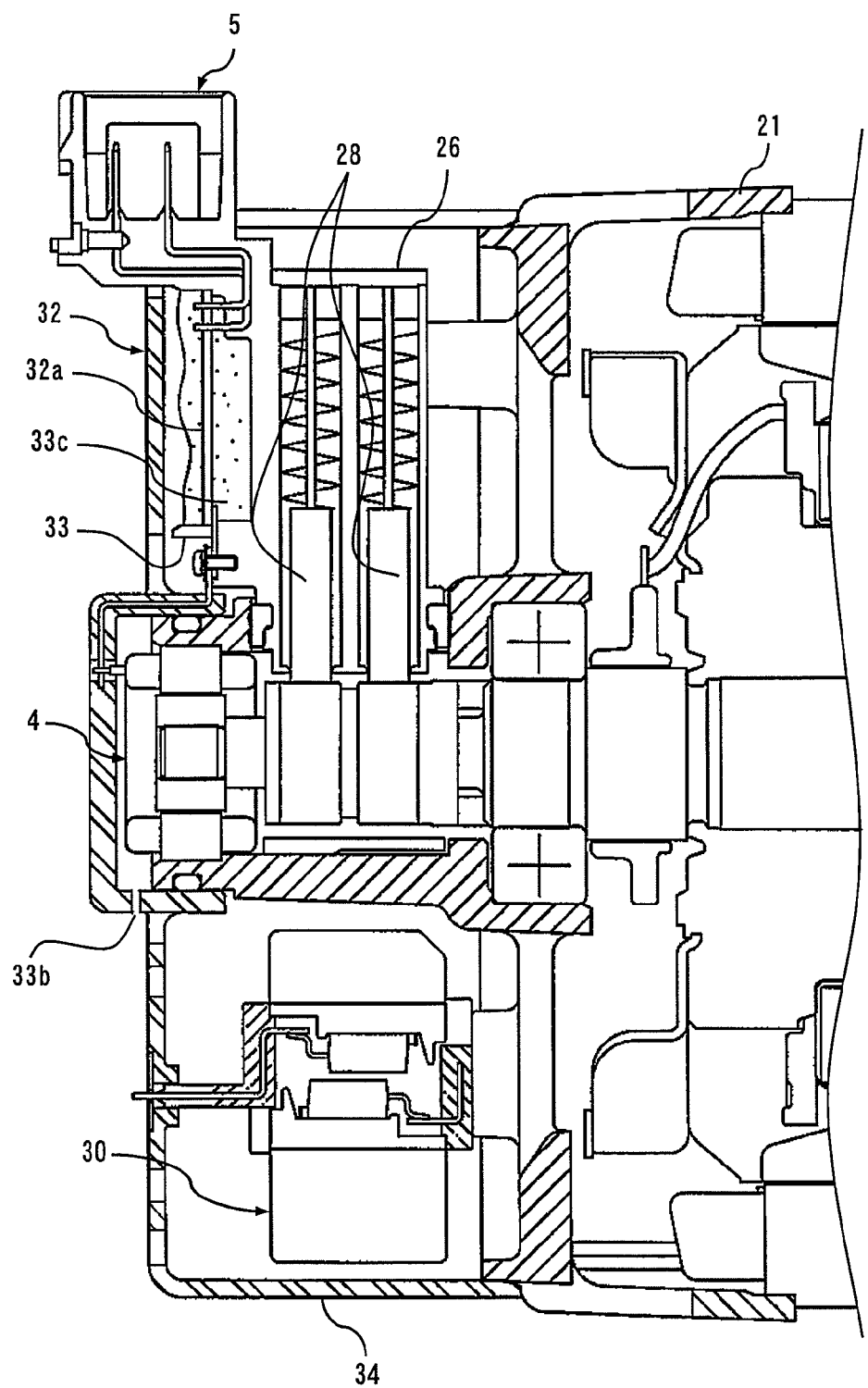
FIG. 9 is a cross-sectional view of the controller-integrated electric rotating machine according to a fourth embodiment of the present invention.

FIG. 9 is a cross-sectional view of the controller-integrated electric rotating machine according to a fourth embodiment of the present invention. In the above-described embodiments, the case 33 for storing the control circuit unit 32 is integrally formed with the cover 34 of the power circuit unit 30 or the external connector 5 with resin. However, the invention is not limited thereto.

As shown in FIG. 9, when the control circuit unit 32 is downsized, the storing case 33 of the control circuit unit 32 and the external connector 5 may be formed integrally with the brush holder 26 with resin. In this case, it is achieved by, disposing the control circuit unit 32 on the brush holder 26, soldering the wiring and then effecting resin sealing with insulated resin 33c for improving resistance to environment. Since the above-described processes can be performed with the single brush holder 26, workability and assembleability of the electric rotating machine are further improved. By performing the resin sealing with the insulated resin 33c, heat of the control circuit unit 32 is transferred to the brush holder 26, and is indirectly cooled by the entire brush holder.

INDUSTRIAL APPLICABILITY

As described thus far, the present invention can be widely applied to the controller-integrated electric rotating machine provided with the power circuit unit and the control circuit unit.

The invention claimed is:

1. A controller-integrated electric rotating machine comprising:
   an electric rotating machine having a rotor with a rotating shaft, a stator disposed so as to surround the rotor, and a brush holder with brushes;
   a power circuit unit having switching elements for converting DC power to AC power for supplying the AC power to the electric rotating machine;
   a control circuit unit for controlling the switching elements of the power circuit unit; and
   a rotational position detection sensor arranged on the rotating shaft for detecting the rotation of the rotating shaft,
   wherein the control circuit unit is disposed at a position where the power circuit unit is not disposed when viewed in the direction of the rotating shaft, and is disposed at a position shifted radially outward so as not to be overlapped with the rotational position detection sensor when viewed in the direction of the rotating shaft,
   wherein the switching elements are arranged in a substantially U-shape,
   wherein the brush holder is arranged in the periphery of the switching elements and is arranged not to overlap with the switching elements when viewed in a direction perpendicular to the rotating shaft,
   wherein the control circuit unit comprises a control circuit board and at least a portion of the control circuit board extends to an outside of a cover of the electric rotating machine; and
   wherein the rotational position detection sensor is disposed on the rotating shaft and is located relatively rear side from the brush holder.

2. The controller-integrated electric rotating machine according to claim 1, wherein the control circuit unit has a rectangular shape when viewed from the direction of the rotating shaft, and connecting portions with respect to the power circuit unit and the rotational position detection sensor are provided intensively to a long side near to the shaft, which is the radially inner side of the control circuit unit and an external connector is provided intensively to one of other sides.

3. The controller-integrated electric rotating machine according to claim 1, wherein the control circuit unit has a shape having at least two sides when viewed from the direction of the rotating shaft, and connecting portions with respect to the power circuit unit and the rotational position detection sensor are provided intensively on one side of the control circuit unit, and connecting portions with respect to an external connector are provided on another side, which is different from the one side.

4. The controller-integrated electric rotating machine according to claim 1, wherein the control circuit unit is formed into a rectangular shape when viewed in the direction of the rotating shaft, wherein connecting portions with respect to the power circuit unit and the rotational position detection sensor are arranged on a long side of the control circuit unit located radially inside, and connecting portions with respect to an external connector are arranged on a short side of the control circuit unit in the circumferential direction.

5. The controller-integrated electric rotating machine according to claim 1, wherein the cover stores the power circuit unit and has a hole for allowing cooling air to flow in to the power circuit unit substantially in the direction of the rotating shaft, and wherein respective heat sinks of the power circuit unit having the respective switching elements each are provided with a cooling fin extending along a cooling air channel in the direction of the rotating shaft.

6. The controller-integrated electric rotating machine according to claim 1, wherein the cover stores the power circuit unit and has a hole for allowing cooling air to flow in to the power circuit unit substantially in the radial direction of the rotating shaft, and wherein respective heat sinks of the power circuit unit having respective switching elements each are provided with a cooling fin extending along a cooling air channel in the radial direction of the rotating shaft.

7. The controller-integrated electric rotating machine according to claim 1, wherein a case for storing the control circuit unit and an external connector are formed integrally with a brush holder of the electric rotating machine with resin.

8. The controller-integrated electric rotating machine according to claim 1, wherein the control circuit unit is disposed at a position shifted outward along the direction of the rotating shaft so as to be exposed to air.

9. The controller-integrated electric rotating machine according to claim 1, wherein the control circuit unit further comprises an insulated resin case that houses the control circuit board and connecting portions that are connected to an external connector.

10. The controller-integrated electric rotating machine according to claim 9, wherein the control circuit unit further comprises position detection sensor provided on a side opposite to the connecting portions.

11. The controller-integrated electric rotating machine according to claim 1, comprising:
    a case for storing the control circuit unit,
    wherein the cover stores the power circuit unit and has a hole for allowing cooling air to flow in, and
    wherein the power circuit unit and the control circuit unit are thermally separated.

12. The controller-integrated electric rotating machine according to claim 11, wherein the case for storing the control circuit unit and the cover for storing the power circuit unit are formed integrally with resin.

13. The controller-integrated electric rotating machine according to claim 11, wherein the cover for storing the power circuit unit includes a relay wiring for connecting the control circuit unit and the power circuit unit by insert molding.

14. The controller-integrated electric rotating machine according to claim 11, wherein the case for storing the control circuit unit also has a function for storing the rotational position detection sensor.

15. The controller-integrated electric rotating machine according to claim 14, wherein the case for storing the control circuit unit includes a relay wiring for connecting the control circuit unit and the rotational position detection sensor by insert molding.

16. The controller-integrated electric rotating machine according to claim 11, wherein the case for storing the control circuit unit is formed integrally with an external connector with resin.

17. The controller-integrated electric rotating machine according to claim 16, wherein the case for storing the control circuit unit includes a relay wiring for connecting the external connector and the control circuit unit by insert molding.

18. The controller-integrated electric rotating machine according to claim 11, wherein the case for storing the control circuit unit comprises: a water-proof structure for preventing entry of water to the control circuit unit; and a water-drain structure for discharging water.

19. The controller-integrated electric rotating machine according to claim 11, wherein the case for storing the control circuit unit also has a function for storing the rotational position detection sensor and has a water-proof structure for preventing entry of water to the control circuit unit and the rotational position detection sensor and a water-drain structure.

20. The controller-integrated electric rotating machine according to claim 11, wherein the interior of the case for storing the control circuit unit is sealed with resin for providing the control circuit unit with a water-proof property.

21. The controller-integrated electric rotating machine according to claim 11, wherein the case for storing the control circuit unit is disposed above the cover for storing the power circuit when viewed in the direction of the rotating shaft.

22. The controller-integrated electric rotating machine according to claim 11, wherein the case for storing the control circuit unit is disposed outside of the electric rotating machine.

23. A controller-integrated electric rotating machine comprising:
 an electric rotating machine comprising a rotor with a rotating shaft and a stator that surrounds the rotor;
 a power circuit unit comprising at least one switching element for converting DC power to AC power and which supplies the AC power to the electric rotating machine;
 a control circuit unit which controls the at least one switching element; and
 a position detection sensor arranged on the rotating shaft for detecting the rotation of the rotating shaft,
 wherein, if viewed in a direction of the rotating shaft, the control circuit unit is positioned so as not to overlap with the position detection sensor and the power circuit unit, and
 wherein the control circuit unit comprises a control circuit board and at least a portion of the control circuit board extends to an outside of a cover of the electric rotating machine.

24. The controller-integrated electric rotating machine of claim 23,
 wherein the control circuit unit is shifted radially outward so as to be further from the rotating shaft than the power circuit unit and the position detection sensor, and
 wherein the control circuit unit extends beyond the electric rotating machine if viewed in a direction of the rotating shaft and connects with an external connector.

25. The controller-integrated electric rotating machine according to claim 23, further comprising:
 a case which stores the control circuit unit,
 wherein the cover stores the power circuit unit,
 wherein the case and the cover are integrally formed, and
 wherein the electric rotating machine, the power circuit, the control circuit unit and the position detection sensor are integrally formed.

* * * * *